(12) United States Patent
Nalur

(10) Patent No.: US 9,913,486 B2
(45) Date of Patent: Mar. 13, 2018

(54) WATER-BASED COATING FOR FROZEN CONFECTION

(75) Inventor: Shantha Chandrasekaran Nalur, Leeds (GB)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/510,512

(22) PCT Filed: Nov. 12, 2010

(86) PCT No.: PCT/EP2010/067342
§ 371 (c)(1),
(2), (4) Date: Jul. 10, 2012

(87) PCT Pub. No.: WO2011/061121
PCT Pub. Date: May 26, 2011

(65) Prior Publication Data
US 2013/0101702 A1 Apr. 25, 2013

(30) Foreign Application Priority Data
Nov. 19, 2009 (EP) ..................................... 09176420

(51) Int. Cl.
*A23G 9/32* (2006.01)
*A23G 3/34* (2006.01)
(Continued)

(52) U.S. Cl.
CPC .............. *A23G 9/322* (2013.01); *A23G 3/343* (2013.01); *A23G 9/48* (2013.01); *A23K 40/30* (2016.05); *A23K 50/48* (2016.05); *A23L 29/10* (2016.08)

(58) Field of Classification Search
CPC ...... A23G 1/56; A23G 9/322; A23G 2200/06; A23G 2200/10; A23G 2200/12; A23G 2200/08; A23G 2220/20; A23G 3/343; A23G 9/48; A23G 3/54; A23V 2002/00; A23V 2250/5118; A23V 2200/228; A23K 1/004; A21D 2/18; A23J 3/08; A23L 1/05
(Continued)

(56) References Cited

U.S. PATENT DOCUMENTS 2,364,592 A * 12/1944 Thomas et al. ............... 426/658
2,898,213 A *  8/1959 Ensler .................... B65D 85/78
426/134
(Continued)

FOREIGN PATENT DOCUMENTS

CN       1049510       2/1991
EP       0465801 A1    1/1992
(Continued)

OTHER PUBLICATIONS

Written Opinion and International Search Report dated Jan. 25, 2011 for corresponding Intl. Appln. No. PCT/EP2010/067342.
(Continued)

*Primary Examiner* — Emily Le
*Assistant Examiner* — Subbalakshmi Prakash
(74) *Attorney, Agent, or Firm* — K&L Gates LLP

(57) ABSTRACT

The present invention relates to water-based coatings for frozen confectioneries intended for animal consumption. In particular, it relates to the use of starch and protein in the preparation of a low fat water-based coating for a frozen confectionery.

17 Claims, 2 Drawing Sheets

(51) Int. Cl.
A23G 9/48 (2006.01)
A23K 40/30 (2016.01)
A23K 50/48 (2016.01)
A23L 29/10 (2016.01)

(58) Field of Classification Search
USPC ........................................................ 426/66, 68
See application file for complete search history.

(56) References Cited

U.S. PATENT DOCUMENTS

| | | | |
|---|---|---|---|
| 3,223,532 A | | 12/1965 | Pinkalla et al. |
| 4,855,156 A | * | 8/1989 | Singer ................ A23G 9/20 426/565 |
| 8,273,399 B2 | | 9/2012 | Bartkowska et al. |
| 2002/0001644 A1 | | 1/2002 | Busse et al. |
| 2008/0131564 A1 | * | 6/2008 | Nalur .......................... 426/93 |
| 2008/0171113 A1 | * | 7/2008 | Ferguson ............... A23G 9/48 426/106 |
| 2008/0241333 A1 | * | 10/2008 | Cina .................... A23C 9/1544 426/565 |

FOREIGN PATENT DOCUMENTS

| | | | |
|---|---|---|---|
| EP | 0560052 A2 | | 2/1993 |
| EP | 0560053 A2 | | 2/1993 |
| EP | 576726 A2 | * | 1/1994 |
| EP | 0986959 A1 | | 3/2000 |
| EP | 1036506 A2 | | 3/2000 |
| EP | 1036506 A2 | * | 9/2000 |
| EP | 1476025 | | 11/2004 |
| EP | 1875810 A1 | | 1/2008 |
| GB | 698760 | | 10/1953 |
| JP | 60226501 A | * | 11/1985 |
| JP | 2005-052008 | | 3/2005 |
| WO | 03/015530 A1 | | 2/2003 |
| WO | WO 03015530 A1 | * | 2/2003 |

OTHER PUBLICATIONS

Deguchi et al., Cooking cellulose in hot and compressed water, Chem. Commun., 2006, pp. 3293-3295.

* cited by examiner

Before Heat Shock     After 2 days heat shock

Before Heat Shock     After 2 weeks heat shock

WATER-BASED COATING FOR FROZEN CONFECTION

CROSS REFERENCE TO RELATED APPLICATIONS

The present application is a National Stage of International Application No. PCT/EP2010/067342, filed on Nov. 12, 2010, which claims priority to European Patent Application No. 09176420.9, filed on Nov. 19, 2009, the entire contents of which are being incorporated herein by reference.

FIELD OF THE INVENTION

The present invention pertains to low fat coatings for frozen confections intended for animal consumption, e.g., consumption by humans, pets, working animals, and the like. In particular, it relates to a water-based coating acting as a non sticking agent in a high moisture environment.

BACKGROUND OF THE INVENTION

Edible coatings are commonly used in frozen confectionery products. They provide a texture or taste contrast and improve the organoleptic properties of the product. On the other hand, coatings have the essential function of delaying melting of the ice confectionery coated therewith and preventing the latter from dripping during consumption.

The most commonly used coatings in the frozen dessert industry are fat-based coatings. These usually consist in milk, sugar, cocoa and fat. However, these coatings are high in calorie and high in fat which make them usually not healthy.

Water-based coatings are also known in the art. WO 0130175 describes for instance an aqueous-based coating for ice confections including sorbets. The coating there-described is based on a water-ice solution typically comprising sugars, stabilisers, fruit solids, citric acids, colours and water.

EP 2025241 relates as well to water-based compositions for coating frozen confections. These compositions are based on the use of saccharides and polysaccharides.

Coatings have shown to be particularly useful for the increasingly popular bite-sized ice confectioneries. However, the coatings used in such bite-sized products must demonstrate, in addition to the usual mechanical properties required for single packaged products, additional characteristics so as to prevent individual products in contact in the same packaging from sticking to each other.

Now, low fat water-based coatings known up to date do not constitute solutions to this problem and in particular do not provide sufficient non sticking effect to fulfil the high standards commanded by this type of application.

OBJECT OF THE INVENTION

There thus remains a need to develop an improved coating for frozen confectionery, which has excellent properties specifically adapted to products packaged together and which answers as well the consumer's growing demand for healthy products with reduced calorie content.

SUMMARY OF THE INVENTION

Accordingly, this is achieved by the features of the independent claims. The dependent claims further develop the central idea of the invention.

Unless otherwise specified, percentages correspond to percentages by weight of the composition.

In a first aspect, the invention provides a water-based coating for frozen confectionery which comprises from 75% to 95% water and from 0.5 to 10% fat, said coating being characterised in that it comprises from 0.5 to 5% of an emulsifier, from 0.5 to 10% gelatinised starch and from 0.5 to 10% denatured protein. The coating is useful for producing confectionary suitable for animal consumption, e.g., consumption by humans, pets, working animals, and the like.

A composite frozen confectionery comprising an ice confection core and a water-based coating as defined above is a second object of the invention.

Finally, a method for producing a composite frozen confectionery comprising an ice confection core and a water-based coating as defined above comprising the steps of:
  a. Preparing a mixture comprising 75 to 95% water, 0.1 to 10% fat, 0.5 to 5% emulsifier, 0.5 to 10% protein, 0.5 to 10% starch and 0 to 10% sugar or sweetening agent;
  b. Heating the mixture;
  c. Homogenizing the mixture;
  d. Pasteurizing the mixture;
  e. Enrobing a frozen confection core with the mixture obtained under d;
and a coating obtainable by said method constitute further aspects of the invention.

FIGURES

The present invention is further described hereinafter with reference to some of its embodiments shown in the accompanying drawings in which.

DETAILED DESCRIPTION OF THE INVENTION

Figure 1:
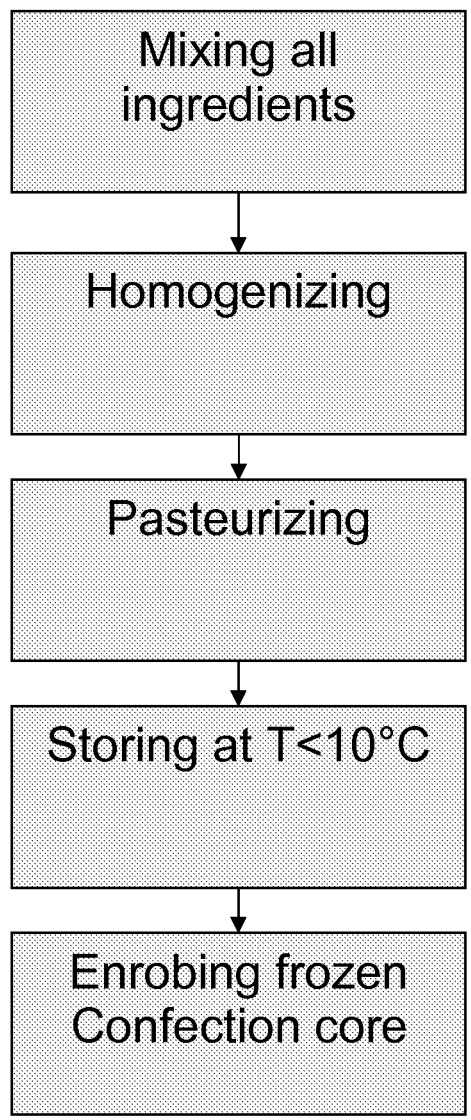
FIG. 1 is a flow chart illustrating a process for the preparation of a composite frozen confectionery comprising a coating according to the invention.

Consumers are looking for products which deliver good health and taste along with convenience. In this context, bite-sized products are very much appreciated. However, they often present the drawback of sticking to each other as packaged together. The coatings according to the present invention were found to advantageously prevent stickiness of ice confectioneries enrobed therewith, while giving good heat-shock stability. Furthermore, the coatings of the invention are low in fat and in calorie, therefore answering the consumer's demand for healthier products.

According to a first aspect of the present invention, the water-based coating for frozen confectionery comprises from 75% to 95% water and from 0.5% and 10% fat. It is characterised in that it comprises from 0.5% to 5% of an emulsifier, from 0.5% to 10% gelatinised starch and from 0.5% to 10% denatured protein.

The water-based coating of the invention has a low fat content. In fact, the amount of fat in the coating composition is comprised between 0.5% and 10% fat and preferably between 0.5% and 3.0%. Preferably, the fat is selected from the group consisting of cocoa butter, cocoa butter improver, cocoa butter equivalent, cocoa butter substitute and cocoa butter replacer. Fat can also include plant oil or animal oil such as palm oil, fractionated palm oils, palm kernel oil, coconut oils, liquid oil such as canola, peanut, sunflower, rapeseed, grape-seed, cotton-seed, soybean and corn oils and animal fats including beef tallow and lard. With its low fat content, the coating advantageously answers the consumer's demand for healthier products and compared to a traditional fat-based coating, the product of the invention has a good nutritional composition. Indeed, a reduction of up to 90% of the fat content and a caloric reduction of more than 85% compared to regular chocolate coating is achievable.

The coatings of the invention are also characterised in that they demonstrate good mechanical properties as well as an improved non stickiness compared to regular water-based chocolate coating.

The water-based coating is in the form of an oil-in-water emulsion. It comprises an emulsifier in a range comprised between 0.5% and 5% by weight. In a particular embodiment, the emulsifier is chosen from the group consisting of sugar esters, emulsifying waxes such as beeswax, carnauba wax, candedilla wax, plant or fruit waxes and animal waxes, polyglycerol fatty acid esters, polyglycerol polyricinoleate (PGPR), polysorbates (polyoxyethylene sorbitan esters), monoglycerides, diglycerides and any possible combinations thereof.

According to a first embodiment, the water-based coating of the invention further comprises from 0.5% to 5% of cocoa powder, cocoa liquor or mixtures thereof. These ingredients give the coating a chocolate aspect and taste. The cocoa powder or the cocoa liquor used may be natural or alkalinised.

According to a second embodiment, the water-based coating of the invention further comprises from 0.5% to 10% of fibers, typically associated with a fruit concentrate or yogurt powder. The fibers are particularly useful for fruit-based or yogurt-based coatings as they improve their mechanical properties. Preferably, the fibers are selected from the group consisting of plant, fruit and animal fibers. Synthetic food allowed fibers can also be used.

According to a particular embodiment, the coating composition comprises less than 10% sugar or sweetening agent.

Sugars, as defined in "Diet, nutrition and the prevention of chronic diseases"—Report of a Joint WHO/FAO Expert Consultation, WHO Technical Report Series 916, WHO, Geneva, 2003 include all mono and disaccharides added by the manufacturer, cook, or consumer i.e. "free sugars", plus sugar naturally present and sourced from honey, syrups and juices.

Typical sugars or sweetening agent used in the composition of the invention include sucrose, fructose, sugar replacers such as polyols (e.g. maltitol, lactitol, isomalt, erythritol, sorbitol, mannitol, xylitol), bulking agents like polydextrose or other sweeteners like tagatose, high-intensity sweeteners like saccharin, aspartame, acesulfame-K, cyclamate, neohesperidin, rhaumathin, sucralose, alitame, neotame, natural sweeteners like Stevia and any possible combinations thereof. Preferably, the sugar used is sucrose or fruit sugars.

The coating according to the invention presents very good mechanical property and excellent film properties. It further provides products coated therewith good heat shock stability.

The quality of the coating is due to the combined presence of protein and starch which, once the first one is denatured and the former one is gelatinised, is at the origin of the formation of a film that was found to constitute an excellent non sticking agent in a high moisture environment. This is particularly advantageous for products that are packaged together and therefore in direct contact, such as bite-sized or miniature products. A lot of film forming agents are disclosed in the prior art but most of these films act as oxygen barrier and very few as non sticking agent in a high moisture system. Moreover, the literature does not describe films applicable to frozen temperatures. From a process point of view, the formation of films described in the prior art usually involves a water evaporation step which cannot be easily integrated in a frozen confectionery production line.

The composition of the invention includes from 0.5% to 10% preferably from 1% to 5% by weight of starch, and from 0.5% to 10% preferably from 1% to 5% by weight of protein.

When subjected to a treatment allowing gelatinisation of the starch and denaturation of the protein, typically a heat treatment, the applicant found out that the compositions of the invention were forming a film with an improved strength and that frozen confectioneries coated therewith were able to keep their integrity when subjected to heat shock.

Most starches and proteins form film when the moisture is dried off. It was very surprising to find such good film property when the combination of starch and protein was dispersed in the water and frozen.

Preferably, the starch is chosen from the group consisting of plant starches, cellulose, pectin, chitin, chitosan, fibers, alginates and gums.

Preferably, the protein is selected from the group consisting of egg protein, dairy protein, meat protein and plant proteins from legumes, nuts, oilseed, and grains.

In terms of organoleptic properties, the coating of the invention is either neutral or has a pleasant taste.

According to a particular embodiment, the coating has a pH below 5 to ensure microbiological stability. This is typically achieved by including an acidic component to the coating composition such as those selected from liquid molasses, organic acids, such as citric acid, gluconic acid, ethylenediaminetetraacetic acid (EDTA) and fruit derived acids.

The coating compositions of the invention are used directly as coating for frozen confectionery. The coating process may be achieved by standard methods known by the skilled person in the art including enrobing, dipping, spraying, water fall or curtain, showering or bottoming. The confectionary is intended for animal consumption, e.g., consumption by humans, pets, working animals, and the like.

According to another aspect of the present invention, the latter thus concerns a composite frozen confectionery comprising an ice confection core and a coating as described above.

The composite frozen confectioneries can adopt various shapes such as drops, spheres, cylinders, bars, cubes, pyramids, sticks, triangles, diamonds/lozenges or cones.

According to a particular embodiment, the composite frozen confectionery is a bite-sized product with a volume comprised between 2 and 10 ml.

According to a first embodiment, the composite frozen confectioneries are intended for human consumption. The core can therefore be chosen from the group consisting of ice cream, mellorine, frozen yogurt, frozen mousse, frozen fudge, frozen custard, fruit sorbet and sherbet and consists preferably in a fudge or a sorbet. Preferably, the ice confection core comprises more than 10% and more preferably more than 20% of sugar or sweetening agent and has an overrun comprised between 25% and 200%.

According to a particular embodiment the composite product has a calorie content comprised between 90 and 250 for 100 g serving.

According to a second embodiment, the composite frozen confectioneries are intended for other animals and in particular for pet consumption. They may consist of frozen pet food treats. Pet food treats typically include food products that supplement a pet's regular diet. Such treats can be provided to a pet for many reasons, including as a reward for performing an activity, an incentive to perform an activity, teeth cleansing, and other reasons.

Preferably the frozen pet treat contains no added sugar.

The composite frozen confectioneries of the invention were found to present good stability against sticking as well as against heat-shock.

A method for producing a coated frozen confectionery according to the present invention comprises in a first step preparing a mixture comprising from 75% to 95% of water, from 0.1% to 10% fat, from 0.5% to 5% of an emulsifier, from 0.5% to 10% protein, from 0.5% to 10% starch and less than 10% of sugar or sweetening agent, and heating the mixture. This heating step is followed by a homogenization step and a pasteurization step. Finally a frozen confection core prepared by standard methods well known by a skilled person in the art is enrobed with the pasteurized mixture maintained at a temperature preferably below 10° C.

Advantageously, the coating of the invention is prepared by a process similar to a standard process for making ice cream. More particularly, the mixture of ingredients composing the coating is initially heated preferably at a temperature comprised between 40° C. and 90° C. for about 5 to 10 minutes. The heated mixture is then homogenised under conditions well known from a skilled person in the art as they are conditions typically used for the preparation of an ice confectionery. Typically, the homogenisation is done at a pressure of between 0 and 3000 psi, a temperature of between 40° C. and 90° C. Homogenization is followed by a pasteurisation carried out preferably at a temperature comprised between 75° C. and 90° C. for between 15 and 100 seconds.

The process of the invention presents several advantages. First of all it is all compatible with a process for the preparation of an ice cream and can therefore be easily integrated into an ice confectionery production line. Furthermore, contrary to most film forming processes existing in the prior art, it does not require any drying step.

The compositions obtainable by the method described above fall under another aspect of the invention. These may be used as a heat shock resistant frozen confectionery coating and present the advantage of being low in fat, while retaining the desirable non sticking characteristics of traditional high-fat coatings.

The present invention is further illustrated by means of non-limiting examples.

EXAMPLES

Example 1

Water-Based Coating Recipe 1

TABLE 1

| Chocolate-based coating recipe | |
|---|---|
| Ingredients | Amount (%) |
| Fat/Oil | 2 |
| Water | 76 |

TABLE 1-continued

| Chocolate-based coating recipe | |
|---|---|
| Ingredients | Amount (%) |
| Starch | 4 |
| Protein | 5 |
| Sugar | 5 |
| Cocoa powder | 6 |
| Emulsifier | 2 |

The coating was made according to the process described in FIG. 1. In a liquefier, ingredients from Table 1 were mixed at a temperature comprised between 60 and 65° and held at 85° for 10 min. The coating composition was then homogenised at 2000 psi and pasteurized at 85° C. for 30 s. The composition was kept at 6° C. for further use.

Example 2

Water-Based Coating Recipe 2

TABLE 2

| Fruit-based coating recipe | |
|---|---|
| Ingredients | Amount (%) |
| Fat/Oil | 2 |
| Water | 78 |
| Starch | 5 |
| Protein | 5 |
| Sugar | 4 |
| Fruit concentrate | 4 |
| fiber | 2 |

The coating was made according to the process described in FIG. 1. In a liquefier, ingredients from Table 2 were mixed at a temperature comprised between 60 and 65° and held at 85° for 10 min. The coating composition was then homogenised at 2000 psi and pasteurized at 85° C. for 30 s. The composition was kept at 6° C. for further use.

Example 3

Ice Cream Core Enrobed with Water-Based Coating

TABLE 3

| Ice cream recipe | |
|---|---|
| Ingredient | Wt % of final product |
| Fat | 1-10 |
| Sugar or sweetening agent | 12-16 |
| MSNF | 2-10 |
| Emulsifier | 0.01-0.1 |
| Stabilizer | 0.2-0.8 |

The mix of ingredients was stored homogenised, pasteurized at standard conditions before being stored at a temperature below 4° C. The mix was then cooled and aerated in a freezer with a temperature comprised between −3° C. and −4° C., under a pressure comprised between 3 and 5 bars. An overrun of between 20 and 100% was provided.

The core composition was then dosed in individual portions by passage through an extruder equipped with a dosing head onto a conveyor belt. An equipment similar to that described in EP0141972 was used.

After a passage through a hardening tunnel, each individual frozen core was coated with the aqueous-based composition described in Example 1 at a temperature below 10° C. by dipping/enrobing.

Example 4

Frozen Pet Treat Enrobed with Water-Based Coating

TABLE 4

Frozen pet treat recipe

| Ingredient | Wt % of final product |
|---|---|
| Fat | 1-10 |
| Added sugar | 0 |
| MSNF | 10-20 |
| Total Solids | 30-40 |

Individual portions of frozen pet treats were coated with an aqueous-based composition described in Example 1 at a temperature below 10° C. by dipping/enrobing.

Example 5

Heat Shock Test

This test consisted in a visual evaluation of coated frozen confectioneries after heat shock treatment. FIG. 2 shows pictures of composite frozen confectioneries before and after heat shock.

Snack bites were placed in a container and subjected to heat shock test. The temperature was cycled from −8° C. to −20° C., with 12 hours at each temperature. Samples were evaluated after week 1 and week 2.

The cores of all composite frozen confectioneries used in this test have been prepared according to Example 3.

Figure 2A:
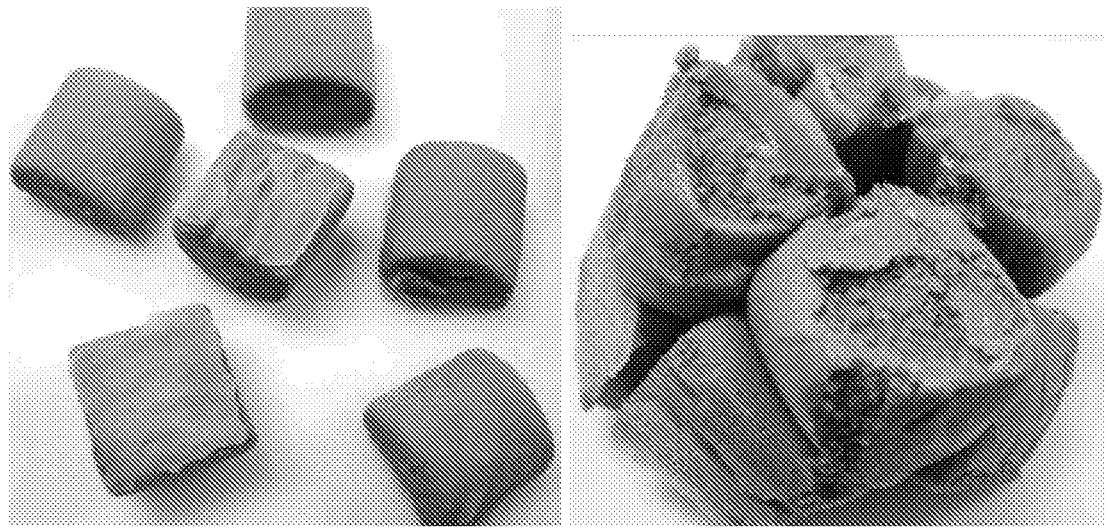
FIG. 2 shows the effect of heat shock on ice cream bites coated with the composition according to the invention, compared to ice cream bites coated with water.

In the case of FIG. 2a), the ice cream cores were coated with water by spraying as well as dipping.

Figure 2B:
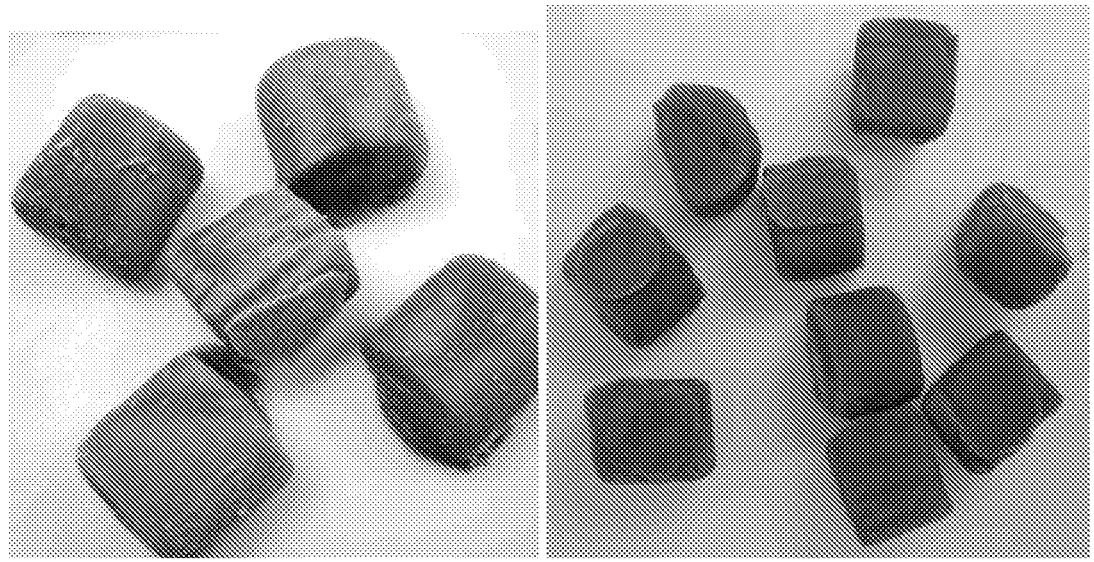

In the case of FIG. 2b), the ice cream cores were coated by dipping the bites with the composition disclosed in Example 1.

FIG. 2a) shows that after only 2 days of heat shock the frozen confectioneries coated with water stuck together in one big clump. Some products even stuck to the cup.

FIG. 2b) shows that after 2 weeks of heat shock frozen confectioneries coated according to the invention maintained their integrity and did not stick together.

The invention claimed is:

1. A plurality of composite frozen confectioneries packaged in contact with each other, each composite frozen confectionery comprising an ice confection core; and a water-based coating comprising 75% to 95% water, 0.5% to 10% fat, 0.5% to 5% of an emulsifier, 0.5% to 10% gelatinised starch and 1% to 5% denatured protein; wherein all proteins in the coating are selected from the group consisting of egg protein, dairy protein and combinations thereof, and the water-based coating prevents the plurality of composite frozen confectioneries from sticking to each other.

2. The composite frozen confectioneries according to claim 1, wherein the water-based coating comprises less than 10% sugar or sweetening agent.

3. The composite frozen confectioneries according to claim 1, wherein the water-based coating comprises from 0.5 to 5% of a component selected from the group consisting of cocoa powder, cocoa liquor and mixtures thereof.

4. The composite frozen confectioneries according to claim 1, wherein the water-based coating comprises 0.5 to 10% of fibers.

5. The composite frozen confectioneries according to claim 1, wherein the gelatinised starch is selected from the group consisting of plant starches.

6. The composite frozen confectioneries according to claim 1, wherein the fat is selected from the group consisting of cocoa butter, cocoa butter equivalent, cocoa butter substitute, cocoa fat improver and cocoa butter replacer.

7. The composite frozen confectioneries according to claim 1, wherein the emulsifier is selected from the group consisting of sugar esters, an emulsifying wax, polyglycerol fatty acid esters, polyglycerol polyricinoleate (PGPR), polysorbates (polyoxyethylene sorbitan esters), monoglycerides, diglycerides and combinations thereof.

8. The composite frozen confectioneries according to claim 1, wherein each frozen confectionery has a volume between 2 and 10 ml.

9. The composite frozen confectioneries according to claim 1, wherein the ice confection core is selected from the group consisting of ice cream, mellorine, frozen yogurt, frozen mousse, frozen fudge, frozen custard, sorbet, fruit sherbet and frozen pet treat.

10. The composite frozen confectioneries according to claim 1, wherein the ice confection core comprises more than 10% sugar or sweetening agent and has an overrun of between 25 and 200%.

11. The composite frozen confectioneries according to claim 1, wherein the ice confection core comprises a frozen fudge or a sorbet.

12. The composite frozen confectioneries according to claim 1, wherein each frozen confectionery has a calorie content comprised between 90 and 250 per 100g serving.

13. A method for producing composite frozen confectioneries, the method comprising the steps of:
  a. preparing a mixture comprising 75 to 95% water, 0.1 to 10% fat, 0.5 to 5% emulsifier, 0.5 to 10% protein, 0.5 to 10% starch and 0 to 10% sugar or sweetening agent, wherein all proteins in the mixture are selected from the group consisting of egg protein, dairy protein, and combinations thereof;
  b. heating the mixture at a temperature between 40 and 90° C. for 5 to 10 minutes;
  c. homogenizing the mixture;
  d. pasteurizing the mixture;
  e. enrobing a frozen confection core with the mixture obtained in d. to form a coating on the core; and
  f. packaging the frozen confectioneries in contact with each other, and the coating prevents the frozen confectioneries from sticking to each other.

14. The composite frozen confectioneries according to claim 1, wherein the gelatinised starch and the denatured protein are formed by heating at a temperature between 40 and 90° C. for 5 to 10 minutes.

15. The method according to claim 11, wherein the mixture comprises 1% to 5% protein.

16. The composite frozen confectioneries according to claim 6, wherein the emulsifying wax is selected from the group consisting of beeswax, carnauba wax, candedilla wax, plant wax, fruit wax, animal wax and combinations thereof.

17. The method of claim 11, wherein the method is performed without any drying step.

\* \* \* \* \*